(12) United States Patent
Flam et al.

(10) Patent No.: US 7,409,398 B1
(45) Date of Patent: Aug. 5, 2008

(54) TECHNIQUES FOR PROVIDING AUDIT TRAILS OF CONFIGURATION CHANGES

(75) Inventors: Ran J. Flam, Port Monmouth, NJ (US); Steven R. Cagle, Red Bank, NJ (US)

(73) Assignee: Sparta Systems, Inc., Holmdel, NJ (US)

( * ) Notice: Subject to any disclaimer, the term of this patent is extended or adjusted under 35 U.S.C. 154(b) by 380 days.

(21) Appl. No.: 10/438,581

(22) Filed: May 15, 2003

Related U.S. Application Data

(60) Provisional application No. 60/380,792, filed on May 15, 2002.

(51) Int. Cl.
*G06F 17/40* (2006.01)
*G06F 17/30* (2006.01)

(52) U.S. Cl. .................... 707/100; 707/101; 707/104.1; 707/3

(58) Field of Classification Search ................. 707/100, 707/101, 104.1, 3
See application file for complete search history.

(56) References Cited

U.S. PATENT DOCUMENTS

| | | | | |
|---|---|---|---|---|
| 5,617,528 | A * | 4/1997 | Stechmann et al. | 715/517 |
| 6,330,600 | B1 * | 12/2001 | Matchefts et al. | 709/223 |
| 6,449,624 | B1 * | 9/2002 | Hammack et al. | 707/203 |
| 6,704,737 | B1 * | 3/2004 | Nixon et al. | 707/101 |
| 2002/0078382 | A1 * | 6/2002 | Sheikh et al. | 713/201 |
| 2003/0158795 | A1 * | 8/2003 | Markham et al. | 705/28 |

OTHER PUBLICATIONS

Sallach, David L., "A Deductive Database Audit Trail", ACM: 1992, pp. 314-319.*
David Deitz, "Addressing 21 CFR Part 11 Requirements with an Automated Configuration Audit Trail and Version Management System", The Official Journal of ISPE, Mar./Apr. 2001, vol. 21, No. 2, pp. 1-8.*
Emerson Process Management, "Device Audit Trail", Product Data Sheet, Jan. 2002, pp. 1-3, Accessed online on Oct. 22, 2007.*
Sparta Systems, Inc. TrackWise 5.5 Release Notes, 1995-2000, (pp. 9).
Sparta Systems, Inc. "TrackWise User's Guide", 1995-2000, (pp. 179).

* cited by examiner

*Primary Examiner*—Charles Rones
*Assistant Examiner*—Phuong-Thao Cao
(74) *Attorney, Agent, or Firm*—Gordon E. Nelson; Michele Liu Baillie

(57) ABSTRACT

Techniques used in configurable systems for providing audit trails for configuration changes. In the techniques, configuration tables in a database system are used to store configuration information. Code is associated with each of the configuration tables that causes changes in the configuration information to be recorded in configuration change tables and the audits are made by querying the configuration change tables. Audit area definition tables define two levels of subsets of the configuration tables and an audit may be limited to one of the defined subsets. An audit may also be limited to changes made by a particular person or changes made over a particular period of time. A simple GUI is used to indicate how the audit is to be limited. The preferred embodiment is implemented in a process control system.

15 Claims, 11 Drawing Sheets

TECHNIQUES FOR PROVIDING AUDIT TRAILS OF CONFIGURATION CHANGES

CROSS REFERENCES TO RELATED APPLICATIONS

The present patent application claims priority from U.S. provisional patent application 60/380,792, Ran J. Flam and Steven R. Cagle, Techniques for automatically creating and maintaining queryable audit trails for configuration changes, filed May 15, 2002. The entire provisional patent application is incorporated by reference herein. Also incorporated by reference herein for all purposes is U.S. Ser. No. 10/117,387, Ran J. Flam, Automated process control with user-configurable states that change upon completion of a user-configurable set of activities, filed Apr. 5, 2002.

BACKGROUND OF THE INVENTION

1. Field of the Invention

The invention relates generally to techniques for maintaining records of changes made in persistent data by data processing systems and more particularly to techniques for maintaining records of changes in persistent data that defines the configuration of the data processing system.

2. Description of Related Art

The task of a large class of applications that run on computer systems is to make changes in persistent data, that is, data that is not lost when the program that is manipulating it ceases execution. Many such programs have provisions for tracking the changes made in the persistent data. A simple example of these provisions is the change tracking arrangements provided by most word processors, which can be used to provide a history of the changes made to a document over time. More complex examples are the logging facilities provided for large database systems, which record every transaction performed in the database system.

The main reason for the existence of logging facilities in large database systems is being able to recover from system failure. If there is a log, one can use the log to redo transactions that were lost because of the failure. Of course, people quickly found other uses for the log. If it could be used to redo transactions, it could also be used to replicate transactions; further, since the log recorded every transaction in the system, it could be analyzed both to see whether the database system's efficiency could be improved and to see how outside events were reflected in the database system. For example, one could examine the log to see whether the number of a certain kind of transaction increased during an advertising campaign. Finally, because the log recorded every transaction, it could be used to make an audit trail, that is, to determine what changes were made as a result of a transaction, who made them, and when they were made.

The chief difficulty with using traditional database system log files to analyze transactions or make audit trails was that the log files recorded changes at the level of the physical blocks used to store data in the database system. While the information was all there, getting it was a tedious and error prone process. Among the techniques used to simplify getting information out of the log files were producing a printable version of the log file in which the information was in printable form and making logical versions of the log. The printable version was of course much more easily read by humans than the original physical log file and could also be searched using standard text search tools. In the logical version, the transaction was described in terms of the query language commands which brought it about. Again, this made it more readable by humans. A further advantage of the logical version of the log was that it could be made into a database table and queried to obtain information from it. An example of such a logical version of the log is the one provided by the LogMiner facility in the Oracle 9i™ data base management system manufactured by Oracle Corporation, Redwood City, Calif.

While printable log files and logical log files are much easier to use than physical logs, getting from a printable log file or a logical log file to an audit trail is still difficult. One reason is the sheer mass of information in the log file; locating the information needed to make a particular audit trail in the log file still requires a precise knowledge of what text is to be searched for in the printable log file or what tables are involved in the transactions in the logical log file in order to make queries that will return the desired information. Another reason is that the information in the log file is still only a starting point. In the LogMiner facility, for example, there is no easy way to relate a transaction to the person responsible for it. The transaction in both the physical log file and the logical log file is identified by a transaction number, and information outside the logical log file is needed to determine what person is responsible for the transaction. Similarly, there is no easy way to determine when a transaction was performed. Transactions are ordered in the physical and logical log files by sequence numbers and there is nothing within the physical or logical log file which provides a mapping from sequence numbers to time.

While making audit trails remains hard, the need for them is increasing. That is particularly the case for process control systems that are used in the pharmaceutical industry. There, 21 CFR Part 11 has extended the audit trail requirements for such process control systems to require audit trails of changes in the configuration of the process control system. What is needed is a way of fulfilling these new requirements that is less cumbersome than the techniques described above for extracting such information from physical log files, printable log files, or logical log files. It is thus an object of the invention disclosed herein to simplify the process of making audit trails of configuration changes.

SUMMARY OF THE INVENTION

The object of the invention is achieved by a configurable system that includes a database management system. The configurable system's database management system includes one or more configuration tables which contain configuration values for the configurable system and one or more configuration change recording tables which record changes in the configuration values. The configurable system further has program code which is automatically executed by the configurable system in response to a change in a configuration value and which records the change in the configuration recording tables. An audit trail of the changes in the configuration values may be obtained by making a query of the configuration change recording tables.

In another aspect, the invention includes a graphical user interface for specifying the query. In addition to recording a change, the configuration change recording tables record the user who made the change and the time at which the change was made and the graphical user interface permits queries to be constrained by the person making the change and/or a period of time.

In a further aspect, a particular change may be related to a value in another of the configuration tables and the graphical user interface permits queries to be constrained by related values.

In yet another aspect, the configurable system's database system has a subset defining table that defines two levels of subsets of the configuration tables and the graphical user interface permits queries to be constrained by subset at either level.

Other aspects include a data storage device that contains code which, when executed in a processor, implements the configurable system and a method of making an audit trail.

Other objects and advantages will be apparent to those skilled in the arts to which the invention pertains upon perusal of the following Detailed Description and drawing, wherein:

BRIEF DESCRIPTION OF THE DRAWING

FIG. 4 shows the GUI for modifying a configuration table;

FIG. 5 shows the GUI that is used to validate a modification;

FIG. 7 shows a first window 701 used to query configuration change tracking tables 188;

FIG. 8 shows how a query of the configuration change tracking tables may be constrained;

FIG. 10 shows a window 1001 used to generate a report; and

Figure 1:
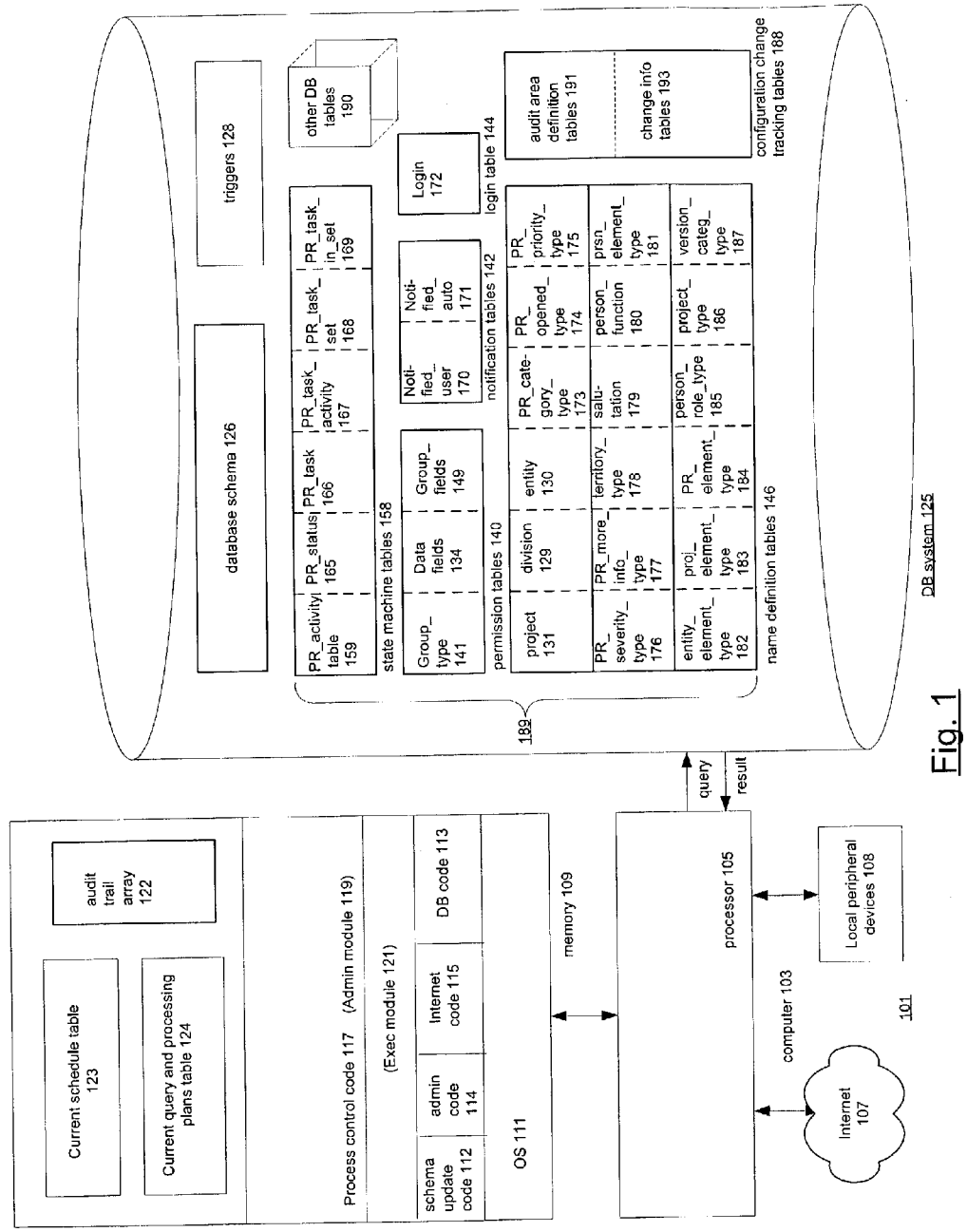
FIG. 1 is a block diagram of a process control system in which the invention is implemented.

Reference numbers in the drawing have three or more digits: the two right-hand digits are reference numbers in the drawing indicated by the remaining digits. Thus, an item with the reference number 203 first appears as item 203 in FIG. 2.

DETAILED DESCRIPTION

Overview of the Process Control System: FIG. 1

FIG. 1 is a schematic overview of process control system 101. System 101 is used to control business processes such as handling orders or customer complaints, but system 101 may be adapted for use in any process control application.

System 101 is implemented using a standard computer 103 that is connected to a standard database system 125. The standard database system may be one such as those made by Oracle Corporation, of Redwood City, Calif. or Microsoft Corporation, of Redmond, Wash. Standard database system 125 includes tables, a database schema which defines the tables, and triggers 128. For purposes of the following discussion, a trigger is code which is associated with a table and is executed by system 101 in response to an event such as a modification of a row of the table. Standard computer 103 has a processor 105 which is connected to Internet 107 and to local peripheral devices 108 as well as to database system 125, which is implemented using non-volatile storage such as that provided by disk drives. Processor 105 has a memory 109 (understood to include both physical and virtual memory) which includes code executed by processor 109. Of interest to the present discussion is standard operating system code 111, Internet code 115, for performing functions such as email and interacting with Web pages according to the HTTP protocol, database code 113, which is part of and controls the operation of database system 125, and process control code 117, which is application code that implements the process control system. Also included in database system 125 are current schedule table 123 and current query and processing plans table 124 in memory 109. These tables contain information which database system 125 uses to accelerate making and executing queries. Process control code 117 includes two subdivisions: administrative module 119, which permits users of system 101 to configure and administer system 101, and exec module 121, which performs process control operations. Exec module 121 uses components of the operating system 111, Internet code 115, and DB code 113 to interact with Internet 107, local peripheral devices 108, and DB system 125. With regard to the interaction with DB system 125, process control code 117 issues queries to DB system 125 and receives the results of the queries from DB system 125. System 101 can run on a single computer 103, which functions as a server for the system, or alternatively it can run concurrently on a plurality of servers for load balancing purposes.

In broad terms, process control system 101 works by making a process record for each process that is being controlled in a PR table in tables 190 and using predefined queries to retrieve records that indicate conditions of the records' processes that require performance of some kind of activity. The predefined queries are either defined by system 101 or configured by the user. The user-configured queries are contained in tables in database system 125. The activity may either be performed by a user of system 101 using an interactive interface or automatically by system 101. The activities to be performed by system 101 are defined by tables in database system 125. For details, see U.S. Ser. No. 10/117,387. To give a concrete example of how system 101 works, one type of process that can be controlled by system 101 is a customer complaint. The exemplary process for dealing with a customer complaint is to assign it to a customer complaint specialist. The customer complaint specialist is to investigate the complaint and reply to the customer within a set time period. If the reply is not timely, the complaint is escalated to the customer complaint specialist's supervisor, again with a time limit for the supervisor to deal with the problem. The activity that corresponds to the escalation is the dispatch of an email message to the supervisor. In system 101, when the complaint arrives, a process record for the complaint is made in a process record table in tables 190. When the complaint specialist replies to the customer, the specialist alters the process record to indicate that the complaint specialist has replied and the time of the reply. System 101 periodically runs a query which queries the process record table for process records that indicate that the complaint specialist has not timely replied. The query further specifies that when the complaint specialist has not timely replied, the activity to be performed is to escalate the complaint by sending email to the supervisor. When system 101 finds such a record in the process record table, it performs the specified activity, as defined by data values in the process record and activity definitions in state machine tables 158.

A particularly important aspect of system 101 for the present discussion is that system 101 is highly configurable. Configuration is done by setting values in rows of configuration tables 189. The tables in configuration tables 189 fall into four groups: state machine tables 158, which define what activities system 101 performs and how the performance of the activity affects the state of system 101, permission tables 140, which define the permissions held by various users of system 101, notification tables 142, which define who is to be notified and how when an activity is performed, login tables 144, which define how users must login, and name definition tables 146, which define the names used for entities in system 101. For example, in system 101, each process monitored by the system belongs to a project and the project is defined in project table 131. The use of configuration tables 189 to configure system 101 also limits the system's configurability so that it can be safely done by non-technical users of system 101. All of the tools provided by DB system 125 for configuring entries in its tables are available to configure the entries in the tables of system 125, as are the user interfaces which DB system 125 provides for those tools.

Figure 3:
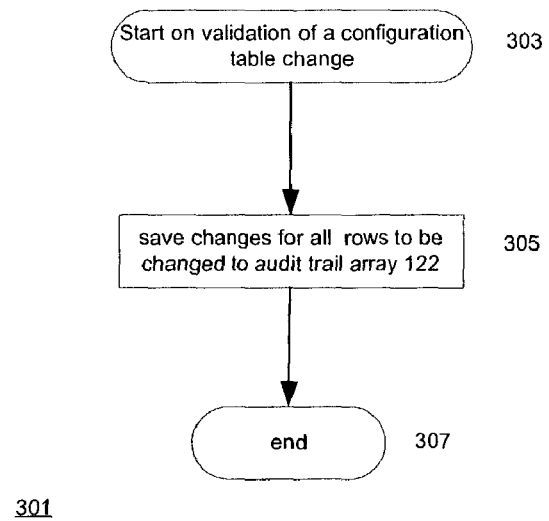
FIG. 3 is a flowchart showing how the change information is captured in the change info tables.
Figure 3:
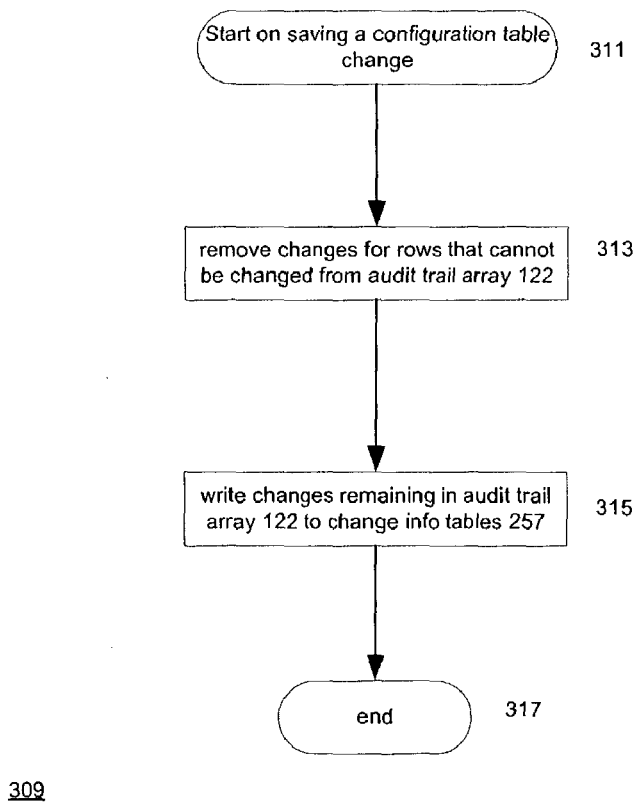

Overview of Making an Audit Trail of Configuration Changes in System 101: FIGS. 1 and 3

As indicated above, users of process control systems like system 101 in the area of pharmaceutical research and manufacture are now required by federal regulation to provide an audit trail of changes made in the configuration of the process control system. To reduce the amount of work involved in making such an audit trail, the following new elements have been added to system 101:

Audit area definition tables 191. These tables identify tables 189 as being subject to audit. identify subsets of tables 189 for particular audits, and identify relationships between configuration tables 189.

Change info tables 193, which contain information about changes in tables 189.

Triggers 128 that are associated with each of the tables in tables 189 and that respond to a modification of a row in a table 189 by recording the modification in audit trail array 122 and eventually in change info tables 193.

Audit trail array 122, which holds changes in memory 109 until they can be written to change info tables 193.

Users with the proper privileges may make changes to tables in system 101 by means of a GUI which permits the user to specify whether a row is to be added, deleted, or modified, and if it is to be added or modified, what values the fields of the row are to have. FIG. 3 shows how such changes made to a row in a configuration table are saved in change info tables 193. At 301 is shown the first stage, which is performed by a trigger which is executed when the change is validated (303). The trigger simply writes the change to audit trail array 122 (305) before performing validation. At 309 is shown the second stage, which is performed by a trigger which is executed when the change is actually written to the configuration table (311). The first step is to remove changes for rows that cannot be changed from audit trail array 122 (313). This is necessary when the validation process indicates that the change cannot be made, for example, because the change violates a referential integrity constraint. The next step is to write the changes to info tables 257 (315).

The information in change info tables 193 may be read using a GUI which permits an authorized viewer to query info change tables 193 by (a) date range, fetching all changes made to the configuration tables during the date range, (b) person, fetching all changes made to the configuration tables by a particular person, (c) configuration areas, (d) configuration subareas, and (e) combinations of any of the above.

The configuration areas and configuration subareas organize the configuration tables into subsets of the configuration tables that are important for auditing purposes. In a preferred embodiment, each configuration subarea corresponds to a single configuration table, which is termed the configuration subarea's affected table. Since the configuration areas and subareas are defined for auditing purposes, a given configuration table may correspond to more than one configuration subarea.

Thus, the GUI provides an interface which permits the user to easily make audits according to configuration areas and subareas and to determine what changes were made in the permission tables in the given configuration area or subarea by a particular person on a particular date. The query results are shown in the GUI as a table; further, reports showing the results can be generated on demand.

Figure 2:
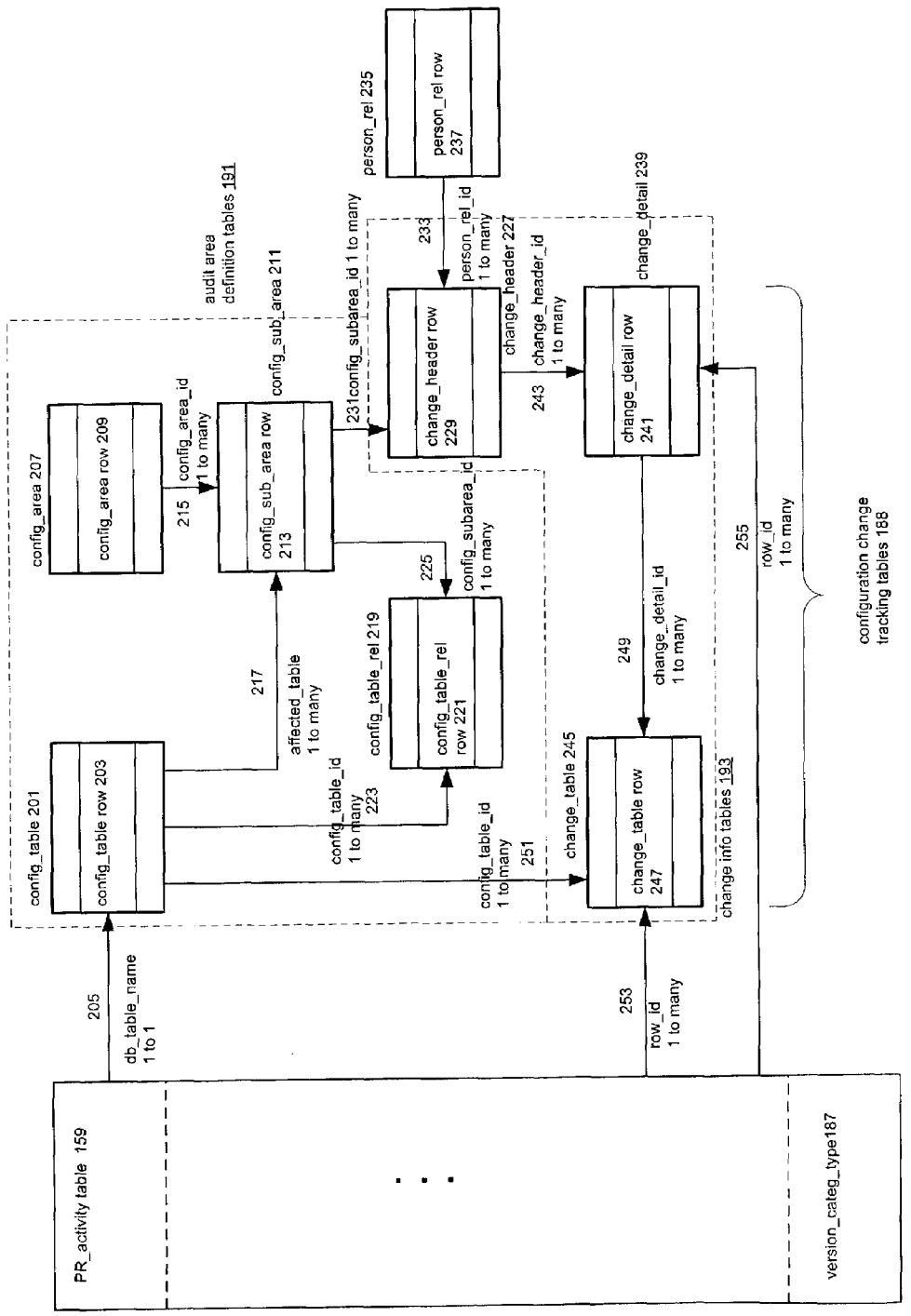
FIG. 2 is a block diagram showing the database tables used in a preferred embodiment to capture the information needed to make an audit trail and the relationships between those database tables.
Figure 11:
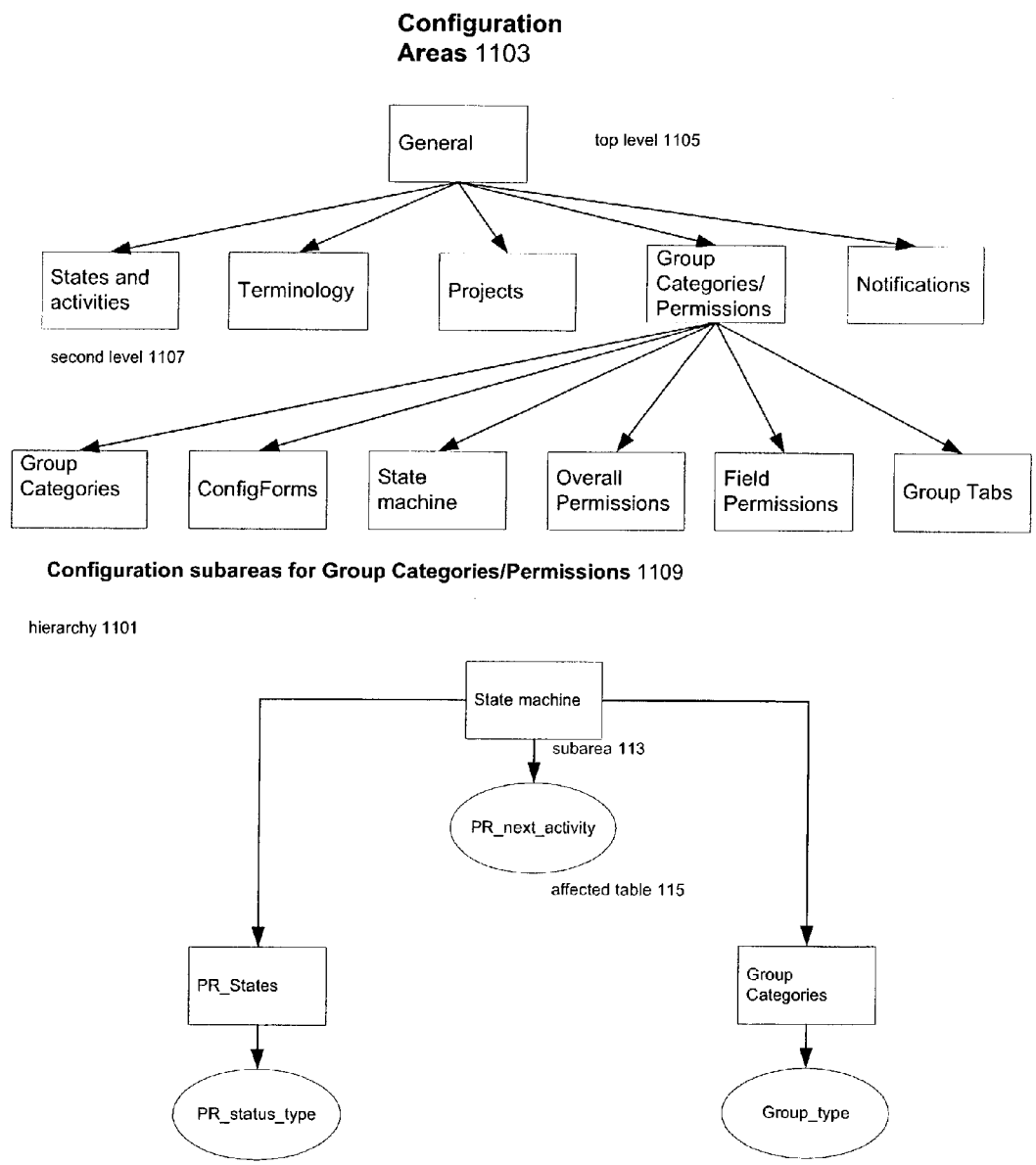
FIG. 11 shows the hierarchy of configuration subareas in a preferred embodiment.

Overview of Configuration Change Tracking Tables 188: FIGS. 2 and 11

Configuration change tracking tables 188 both record changes in configuration tables 189 and make possible the queries that have just been described. FIG. 2 is an entity-relationship diagram of configuration change tracking tables 188 which shows their relationships to configuration tables 189, to person_rel table 235, which identifies users of system 101, and to other tables in change tracking tables 188. There are two classes of tables in configuration change tracking tables 188: change info tables 193, which contain the actual information about a particular change, and audit area definition tables 191, which define the tables that belong to configuration tables 189, how those tables are subdivided into configuration areas and subareas, and other relationships between subareas and configuration tables.

In FIG. 2, each oblong indicates a table in DB system 125. The arrows indicate relationships between rows of the tables connected by the arrow. The table at the tail end of the arrow contains a field whose value appears in a field of one or more rows of the table at the head end of the arrow. The relationship between the record in the table at the tail of the arrow and the records in the table at the head of the arrow may be one-to-one, i.e., the table at the head of the arrow has exactly one row with a field that contains the value of the field in the row of the record at the tail of the arrow, or one to many, where the table at the head of the arrow may have many rows with fields containing the value of the field in the row of the record at the tail of the arrow. In this implementation, the field values that establish the relationships between the tables shown in FIG. 2 are identifiers of records in the tables at the tails of the arrows. The arrows are labeled with the name of the field in the table at the tail of the arrow.

In overview, the tables in audit area definition tables 191 are the following:

Config_table 201: This table defines which tables belong to configuration tables 189. There is a row 203 in this table for each of those tables. As indicated by arrow 205, the row includes the name of the table in configuration tables 189 that it specifies.

Config_area 207: This table defines the configuration areas. Each row 209 defines the name of one configuration area. Config_sub_area 211: This table defines the configuration subareas. Each configuration subarea belongs to a single configuration area. There is a row 213 in the table for each configuration subarea and fields in the row specify the name of the subarea, identify the configuration area the configuration subarea belongs to (arrow 215), and identify the row in config_table 201 (arrow 217) corresponding to the configuration subarea's affected table.

Config_table_rel 219: This table defines relationships between a subarea and configuration tables other than the subarea's affected table.

Change_header 227: In system 101, configuration changes are made in a session in which an authorized person makes changes to a table in a given configuration subarea. There is a row in this table for each such session, and the row contains the ID of the row for the configuration subarea's configuration area in config_area 207, the ID of the row for the configuration subarea in Config_sub_area 213, the ID of the row for the person making the change in person_rel 237, the meaning of the changes, and the date/time the changes were implemented.

Change_detail 239: There is a row 241 in this table for each addition of a row to, deletion of a row from, or modification of a row in a configuration table 189. The information stored in each row specifies: the ID of the row for the session in change_header 227, the ID of a row in the affected configuration table 189, the type of change to the row in the affected table, and a text summary of the change (to facilitate reporting).

Change_table 245: This table relates changes recorded in rows in change_detail table 209 to rows in configuration tables other than the one specified in the change_detail row. Triggers related to every screen of the TrackWise Administrator have been modified so that upon "Save", the pertinent change information is analyzed and then recorded in change info tables 193.

Audit area definition tables 191 define a hierarchy of configuration areas and subareas and also define relationships between configuration subareas. FIG. 11 shows a portion of the hierarchy 1101 of configuration areas and subareas. The configuration areas and the configuration subareas form a three-level hierarchy. At the top level 1105 is the configuration area General which includes all of the other configuration areas and thus all of the configuration subareas. The next level 1107 is the individual configuration areas 1103. Each configuration area 1103 contains a number of configuration subareas 1109; only those for the configuration area Group Categories/Permissions are shown in FIG. 11.

Audit area definition tables 191 also define relationships between a subarea and configuration tables other than the subarea's affected table. One such relationship is shown at 1111 in FIG. 11. As above, the rectangles represent configuration subareas 113; the ovals represent the subarea's affected table 115. Thus, the subarea StateMachine has the affected table 115 PR_next_activity. Configurations in the configuration table PR_next_activity are described using values in the configuration tables PR_status_type and Group_type, and consequently, the State_machine subarea is related to the PR_states and Group Categories subareas and to those subareas' affected tables.

Details of Configuration Change Tracking Tables 188 config_table 201

This table specifies each of the configuration tables 189 in system 101.

```
CREATE TABLE Config_table (
    id                  NUMBER (12) NOT NULL,
    name                VARCHAR2 (254) NOT NULL,
    db_table_name       VARCHAR2 (40) NOT NULL,
    is_primary          NUMBER (2) NOT NULL,
    date_updated        DATE NOT NULL
)
```

Explanation:

There is a row in this table for each of the configuration tables 189. The row contains the following data fields that are relevant for the current discussion:

(a) id: an ID for the row which is unique in this table;
(b) name: the name system 101 uses to identify the table represented by the row to a user of system 101. For example, the name "Group Categories" identified the table whose name in database system 125 is Group_type;
(c) db_table_name: the name that database system 125 uses to identify the configuration table represented by the row; thus, if name is "Group Categories", db_table_name will have the value Group_type;
(d) date_updated: the date and time that this row was last updated.

Config_area 207

This table defines the names of the Config Areas. These names are the top level in the hierarchy into which the configuration areas are organized. There is a row for each configuration area in the table.

```
CREATE TABLE Config_area (
    id              NUMBER (12) NOT NULL,
    name            VARCHAR2 (254) NOT NULL,
    date_updated    DATE NOT NULL
)
```

Explanation:

A row in this table contains the following data fields:
(a) id: an ID for the row which is unique in this table;
(b) name: name of the Config Area, e.g., "StateMachine", "Permissions", or "Terminology",
(c) date_updated: the date and time that this record was last updated.

Example name: "StateMachine"

Meaning:

As specified by the configuration subareas belonging to the configuration area "StateMachine", this configuration area is the set of configuration subareas to which the configuration tables 189 belong that are used to configure system 101's state machine.

Config_sub_area 211:

This table defines the names of the configuration subareas and relates each subarea to its configuration area and to its affected table. There is a row in this table for each configuration subarea.

```
CREATE TABLE Config_sub_area (
    id                  NUMBER (12) NOT NULL,
    name                VARCHAR2 (254) NOT NULL,
    config_area_id      NUMBER (12) NOT NULL,
    affected_table_id   NUMBER (12) NOT NULL,
    date_updated        DATE NOT NULL
)
```

Explanation:

This table's rows contain the following data fields:
(a) id: an ID for the row which is unique in this table
(b) name: name of the configuration subarea, e.g., "Activity Types", "PR States" and "Field Permissions".

(c) config_area_id: Id of the row in Config_area 207 for the configuration area that this configuration subarea belongs to.

(d) affected_table_id: an ID of a record in Config_table 201 which identifies the configuration subarea's affected table.

(e) date_updated: the date and time that this record was last updated.

Example name: "Activity Types"

config_area_id: 1, where row 1 is the row for the "StateMachine" configuration area.

Meaning:

This configuration subarea, named "Activity Types", is a subarea of the "StateMachine" Config Area.

Config_tables_rel

This table relates a given configuration subarea to one or more configuration tables other than the configuration table's affected table, as well as to the configuration subareas to which the other configuration tables belong. The information in the table is used in a preferred embodiment to make the graphical user interface for queries relating to the given configuration subarea and also to make the records in Change_Table that relate changes made in the affected table and recorded in change_detail 239 to relevant rows of the related configuration tables.

```
CREATE Config_table_rel (
    id                  NUMBER (12) NOT NULL,
    config_sub_area_id  NUMBER (12) NOT NULL,
    config_table_id     NUMBER (12) NOT NULL,
    seq_no              NUMBER (6),
    date_updated        DATE NOT NULL
)
```

Explanation:

This table contains the following data fields:

(a) id: a unique ID in this table.

(b) config_area_id: an ID of a row in Config_sub_area table 211 for the configuration subarea to which this row belongs.

(c) config_table_id: an ID of a row in config_table 201 table for the related configuration table and thus for the related configuration subarea represented by the row.

(d) seq_no: a number which indicates how information from the table specified by config_table_id will appear in the graphical user interface.

(e) date_updated: the date and time that this record was last updated.

Example config_sub_area_id: a Config_sub_area.id indicating the configuration subarea Activity Types config_table_id: pointing to the entry for the Group_type configuration table in config_table 201.

seq_no: 1

Change_header 227

This table stores information that is common to all detailed changes implemented during a single Edit-Save session in a given configuration subarea. This common information is: (a) Config Sub-Area ID, (b) ID of the person who made the changes, (c) meaning, and (d) date updated.

```
CREATE Change_header (
    id                  NUMBER (12) NOT NULL,
    config_sub_area_id  NUMBER (12) NOT NULL,
    person_rel_id       NUMBER (12) NOT NULL,
    meaning             VARCHAR2 (1024) NOT NULL,
    date_updated        DATE NOT NULL
)
```

Explanation:

This table contains the following data fields:

(a) id: a unique ID in this table, (b) config_sub_area_id: an ID of a row in Config_sub_area table 211 indicating the configuration sub area to which the configuration table that is affected by a given change belongs to, (c) person_rel_id: an ID of a row in Person_rel table 235 that identifies the person (admin user) who is responsible for the given Edit-Save session, (d) meaning: A character string, indicating the meaning (reason) for the given change (e) date_updated: the date and time that a given Edit-Save session has ended, i.e., the time that "Save" operation has been selected by the admin user.

Example config_sub_area_id: a Config_area.id indicating the configuration subarea PR States person_rel_id: 17, indicating that person ID=17 is the person who performed the changes in the table belonging to the PR_states configuration subarea.

Change_detail 239

This table stores change-specific details at the lowest level. For instance, if a given Edit-Save session was for the Field Permissions configuration subarea, there will be as many entries in this table for this session as there were fields whose permission were changed during the session. The information stored in each entry in this table specifies: (a) the ID of a record in the Affected Config Table, (b) the type of change (new, modified, or deleted), and (c) description—a text summary of the change (to facilitate ease of reporting).

```
CREATE Change_detail (
    id                NUMBER (12) NOT NULL,
    change_header_id  NUMBER (12) NOT NULL,
    record_id         NUMBER (12) NOT NULL,
    change_type       NUMBER (2) NOT NULL,
    description       VARCHAR2 (2000) NOT NULL,
    date_updated      DATE NOT NULL
)
```

Explanation:

This table contains the following data fields:

(a) id: a unique ID in this table, (b) change_header_id: an ID of a record in the Change_header table, indicating the Change Header that a specific change, i.e., a record in the Change_header table, is associated with, (c) record_id: an ID of a record in the subarea's affected table, identifying the record which has been changed, i.e., a new record that was inserted, a record that was modified, or a record that was deleted; we note that based on the value of change_header_id, pointing to a record in the Change_header table, we can determine the related configuration subarea, and hence, the affected table (through the value of the affected_table id defined in the Config_sub_area table), (d) change_type: an indicator of the type of change that was applied: 1=New—a new record inserted into the affected table, e.g., a new State, new Activity Type, 2=Modified—an existing value that was modified, e.g., "Hardware" changed to "H/W", and 3=Removed—a record which was removed (deleted, inactivated) from the affected table, (e) date_updated: the date and time that a given change was applied.

Change_table 245

This table relates a row in change_detail table 239 that records changes in a configuration subarea for which there are entries for other related tables in Config_tables_rel 219 to the rows in the other related tables that are relevant to the change recorded in the change_detail table row. There is a row in the Change_table for each of the rows in the other related tables that are relevant to the change_detail row.

```
CREATE Change_table (
    id                  NUMBER (12) NOT NULL,
    change_detail_id    NUMBER (12) NOT NULL,
    config_table_id     NUMBER (12) NOT NULL,
    record_id           NUMBER (12) NOT NULL,
    date_updated        DATE NOT NULL
)
```

Explanation:
This table contains the following data fields:
 (a) id: a unique ID of the row in this table,
 (b) change_detail_id: an ID of a row 241 in Change_detail table 239.
 (c) config_table_id: an ID of a row in config_table 201 indicating the other configuration table that is related to the affected table specified in change_detail row 241.
 (d) record_id: an ID of a row in the table specified by config_table_id that contains a value that is relevant to the change in the affected table specified in change_detail row 241.
 (e) date_updated: the date and time that a given changed was saved to the database.

The function of the table can be explained using configuration subarea StateMachine from Group Categories/Permissions. The configuration table belonging to StateMachine is PR_next_activity (not shown in FIG. 1). The changes in PR_next_activity that may be made via the StateMachine configuration subarea are based on definitions from two other configuration subareas, Group Categories, whose corresponding table is Group_type (also not shown in FIG. 1), and PR_States, whose corresponding table is PR_Status_type (165 in FIG. 1). This relationship between the tables is recorded in rows in Config_table_rel 219 whose config_sub_area_id fields specify the StateMachine subarea. There is a row for the PR_status_type table and one for the Group_type table. Because any change in PR_next_activity involves information from a row of Group_type and a row of PR_status_type, there will be two rows in Change_table 245 for each row in change_detail 239 that records a change in PR_next_activity. change_detail_id in each of these rows is the ID of the row in change_detail 239 that records the change, config_table_id in one of the rows will specify Group_type and in the other, PR_status_type, and in those records, record_id will point to the record in Group_type or PR_status_type that is relevant to the change in PR_next_activity.

The User Interface for System 101: FIGS. 4-10

Any of the data in process control system 101's database system 125 can of course be read or modified by using queries written in the standard SQL query language; most users of system 101, however, do not interact with database system 125 by writing queries, but instead by means of a graphical user interface in which queries are defined by entering information in fields of a table and selecting an operation. In most cases, the information can be entered by selecting a value from a drop-down menu or by means of a checkbox. The following discussion will first discuss the graphical user interface for entering data into a configuration table and then the graphical user interface for querying the configuration tables to obtain an audit trail.

Figure 4:
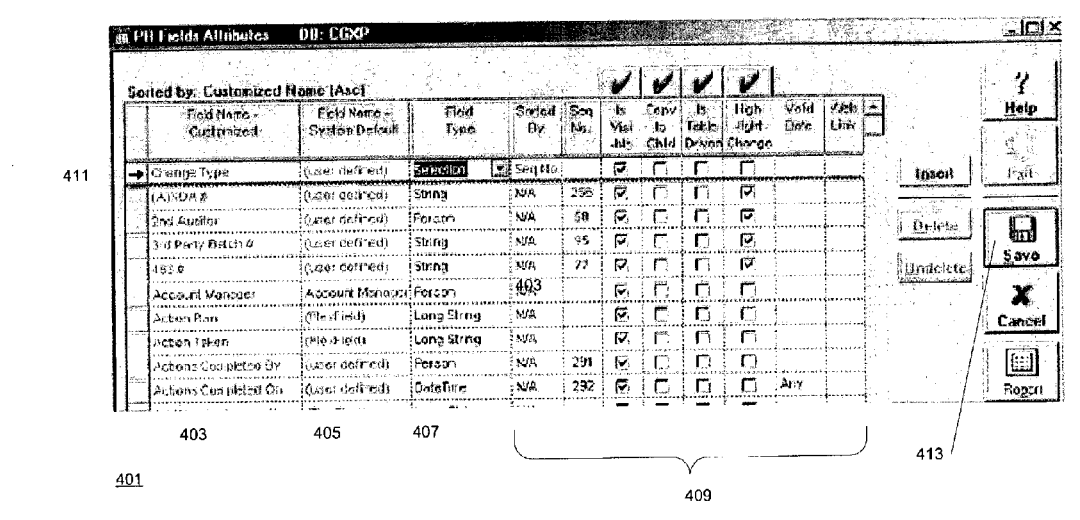
Figure 5:
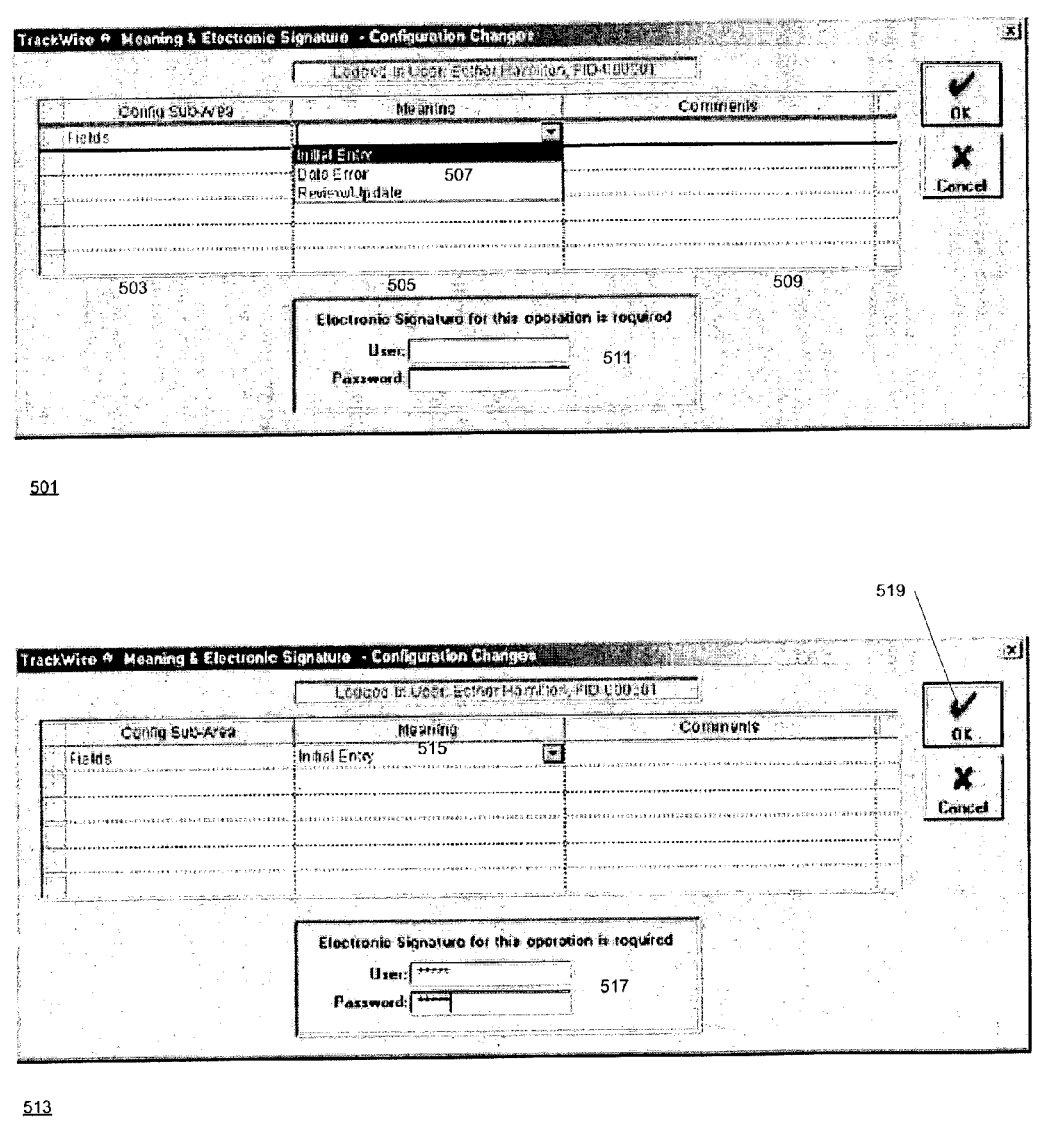
Figure 6:
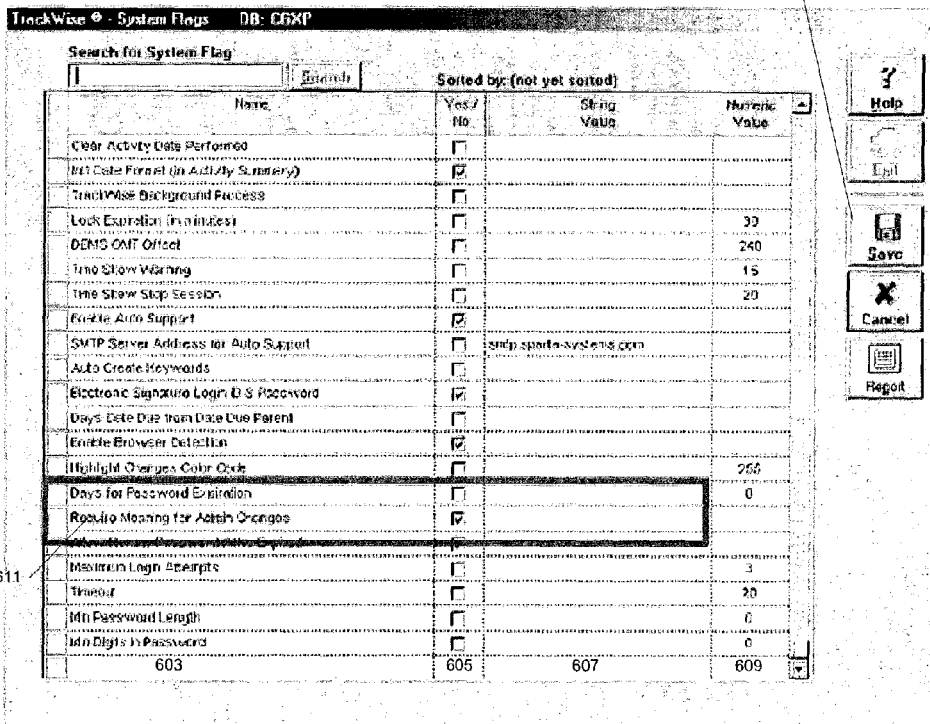
FIG. 6 shows the GUI that is used to set and reset the Require Meaning for Admin Changes flag.

Entering Data in a Configuration Table: FIGS. 4-6

FIG. 4 shows the window 401 that is used in system 101 to define user-defined fields. Window 401 presents the user with a table in which each row contains the current configuration information for one field. The fields in the row include the name by which the field known to users of the system at 403, the system default name for the field if there is one at 405, the field's data type at 407, and various other attributes of the field at 409. The row that is of interest to the current discussion is shown at 411. The change being made is to specify that values belonging to the field have the selection data type, i.e., there is a list of possible values for the field and the user selects a value from the list. Having thus modified the configuration of the field, the user presses save button 413.

In this case, the field whose configuration is being modified is defined in one of the tables 189 listed in config_table 201. Consequently, system 101 creates an audit trail for the change. What the user sees of this is the windows shown at 501 and 513. Window 501 lists the changes that are pending when the user presses save button 413. Here, there is only one change. A user-configurable field has been changed. The configuration sub area to which this change belongs is Fields, as shown at column 503. In addition to making the change, the user making the change must enter a reason why the change is being made at 505 using dropdown list 507 and may enter a comment at 509; further, an electronic signature is required to authenticate the person making the change, and the person making the change enters the electronic signature at 511. 513 shows the window as it appears when the user is ready to confirm what is in the window by clicking on OK button 519. "Initial entry" has been selected for the reason, as shown at 515, and at 517, the user has entered his/her electronic signature. In a preferred embodiment, a flag in system 101 specifies whether the user must specify a reason for making the modification and apply an Electronic Signature. The window for setting the flag is shown at 601; the window has a row 611 for each flag; the fields in the row give the flag's name at 603 and a choice of values: binary at 605, string at 607, and numeric at 609. To enter a change, one clicks on save button 613. As shown at 611, the flag Require meaning for admin changes is currently set to yes.

In terms of the tables of FIGS. 1 and 2, the operation has the following effect. The row changed by the operation is in data_fields 134. When the user clicks on save button 413, a trigger associated with the data_fields table validates the change. The code executed by the trigger begins by checking config_table 201 for an entry for data_fields. If one exists, and the modification is otherwise valid, the trigger code determines data_fields' subarea from config_subarea 211. Having determined the subarea, the trigger code displays the screens shown in FIG. 5 to the user. The electronic signature information input at 517 is used to locate the record for the person making the change in person_rel table 237.

With data_field's subarea, the ID for the record for the person making the change in person_rel table 237, the kind of change, and the changed field value, the information input to meaning field 507, and any comment input to comment field 509, the trigger software has the information needed to make an entry for the change in audit trail array 122. When the change to data_fields 134 is actually written to that table, another trigger that is executed on the save uses the information in the entry for the change in audit trail array 122 to write the row for the session making the change in change_header 227 and the row for the change itself in change_detail 239.

In writing the row in change_header 227, the save trigger uses the subarea to determine the row of config_subarea table 211 whose index is to go into the config_sub_area_id field of the change session's row in change_header table 227. The id of the row for the person making the change in person_rel table 235 goes into person_rel_id and the input from meaning field 505 of screen 501 goes into the meaning field. The date_updated field is set to the date and time the user specified the save operation.

In writing the row in change_detail 239, change_header_id is set to the row for the session in change_header table 227, record_id is set to the ID of the record in data_fields table 134 being written, change_type is set to the type of change being made (in this case an update), description receives the changed value, and date_updated is the date and time that data_fields table 134 was actually modified.

Where the subarea to which the affected table belongs has entries in config_table_rel 219 for related tables, the trigger that writes the change in the affected table to audit trail array 122 also writes the row ids for the rows in the related tables that are related to the change to audit trail array 122. The trigger that writes the change_detail row 241 for the change uses the information from audit trail array 122 to write the change_table rows 247 for the rows from the related tables.

Making Audit Trail Queries: FIGS. 7-10

Figure 7:
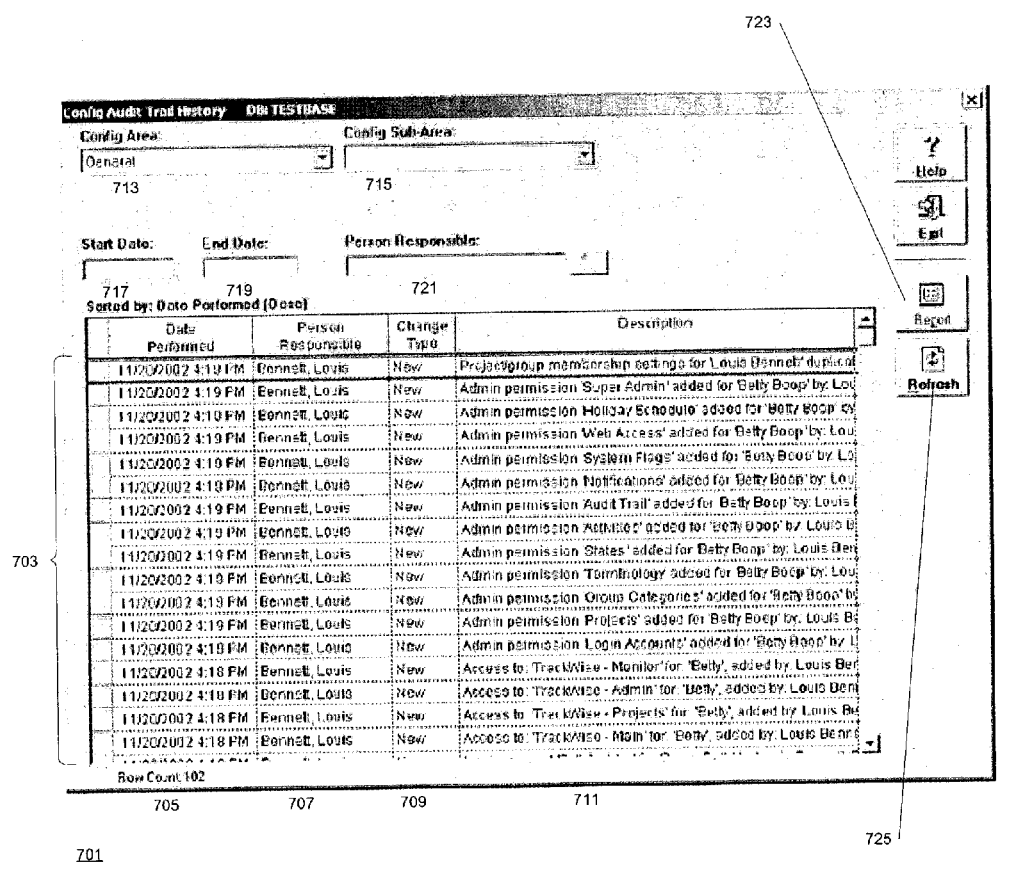

To make an audit trail, system 101 simply runs a query on configuration change tracking tables 188. The query may be limited to configuration area or subarea, to changes made by a particular person, to changes made between specific times, or to any combination of the above. FIG. 7 shows the general form of the GUI used to make a query. Window 701 has a table 703 which contains a row for each query result. The fields of the row include date performed 705, which is the date the operation was performed, person responsible 707, which is the name of the person who made the change, the type of change, and the description of the change, which includes the old and new values of the change. The information in the row of course comes from the rows in change_header table 227 and change_detail table 239 that are relevant to the change.

What rows from these tables are selected by the query is determined by the information input by the person making the query in fields 713-721. Field 713 is filled out from a drop-down list that specifies one of the configuration areas in configuration_area 207; when a configuration area is specified, the query will not return changes made in other configuration areas. The General configuration area seen in FIG. 7 specifies that the query return changes from all of the configuration areas. Field 715 permits the user to specify a configuration subarea, again from a drop-down list of the subareas. When a configuration subarea is specified, the changes returned by the query are limited to that subarea. Fields 717 and 719 permit the user to specify that the changes returned by the query be made between the dates specified in the fields. Field 721 specifies that the changes returned by made by a specific person, again specified from a drop-down list. Thus, a query may be made using window 701 that specifies all changes made in a given subarea by a given person over a given period of time. When the user clicks on button 723, the system generates a report based on the table 703 that appears in window 701; when the user clicks on button 725, the query specified by fields 713-721 is run on configuration change tracking tables 188 and table 703 is updated to show the results of the query.

In general, the queries made using the GUI work as follows:

If only a configuration area is specified, table 703 is made from information in all of the change_header rows selected whose config_sub_area_id fields have values specifying any of the records in config_sub_area 211 representing subareas in the configuration area and all of the change_detail rows whose change_header_id field specifies any of the selected rows in change_header. In the case of the General configuration area, all of the records in change_header table 227 and thus all of the records in change_detail table 239 are selected.

If a configuration subarea is specified at 715, table 703 is made as above, except that the change_header rows selected are only those whose config_sub_area_id specifies the specified configuration subarea.

If a configuration subarea has rows for related configuration tables in config_table_rel 219, fields additional to fields 713-721 for the subareas to which the related tables belong appear in the window for a query that is reading data. The additional fields may be used to select values from the related tables, and these values further limit the query.

If a person responsible for the change is specified at 721, the change_header rows are further filtered so that only those for which the value of person_rel_id indicates a row in person_rel table 235 which represents the person indicated are used to make table 703.

If a start date and an end date are specified at 717 and 719, the change_header rows are further filtered so that only those in which the value of the date_updated field is between the start date and end date are used to make table 703.

Figure 8:
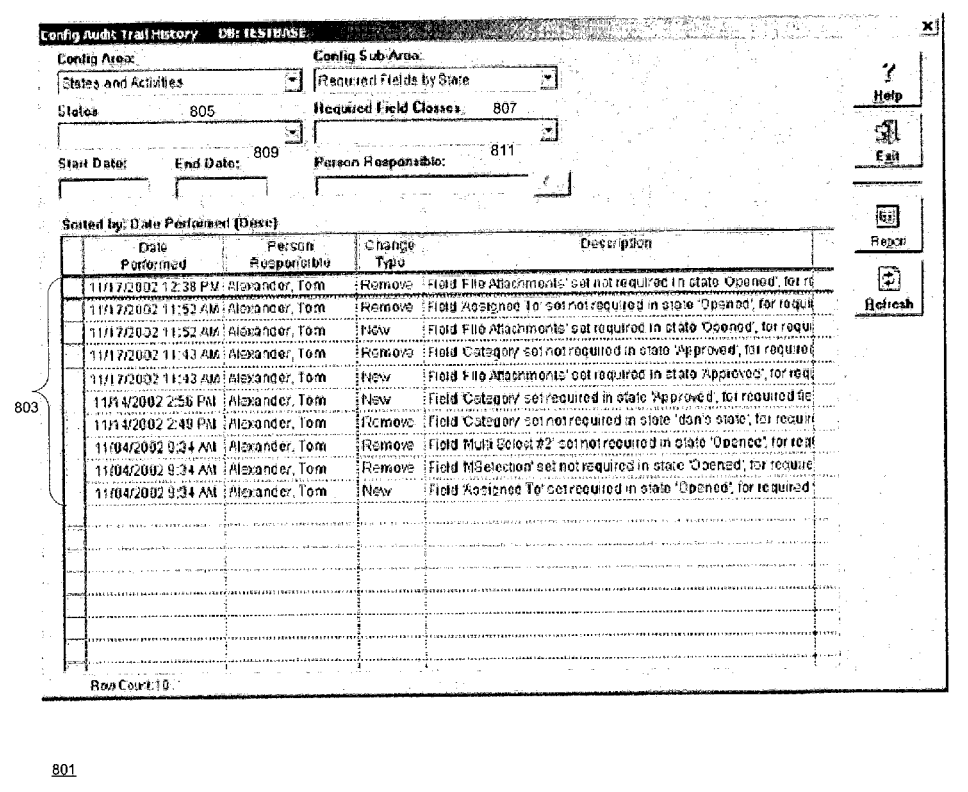

The result of selection of a subarea in field 715 is shown in FIG. 8. There, window 801 shows that the configuration area States and Activities has been selected at 805 and within that configuration area, the configuration subarea Required Fields by State has been selected. The result of the query made using these constraints is shown at 803.

FIG. 8 also shows how for certain configuration subareas, additional selection fields are available for related subareas. In the case of the subarea Required Fields by State, the related subareas are States, as shown at 809, and Required Field Classes, as shown at 811. The affected table for States is the table PR_status_type, which defines the set of statuses that a PR record may have; the drop-down menu for field 809 is a list of the states defined by the PR_Status_type table. Similarly, the affected table for Required Field Classes is the table Req_fields_type, which defines the classes a required field may have; the drop-down menu lists the classes.

When a value is selected for one or both of these fields, the query is further constrained by the value. When the query is run, for each Change_detail row selected by the constraints specified in fields 713-721, the value of the id field is used to obtain the row(s) from Change_table 245 that correspond to the selected Change_detail row and the information in these rows is used to determine whether the row in the related configuration table has the value specified in the query. Only if that is the case is the Change_detail row selected for the result table The information needed to label fields 809 and 811 and make their drop-down menus comes from the config_table_rel rows 221 corresponding to the row 213 in config_subarea 211 for the subarea Required Fields by State.

Figure 9:
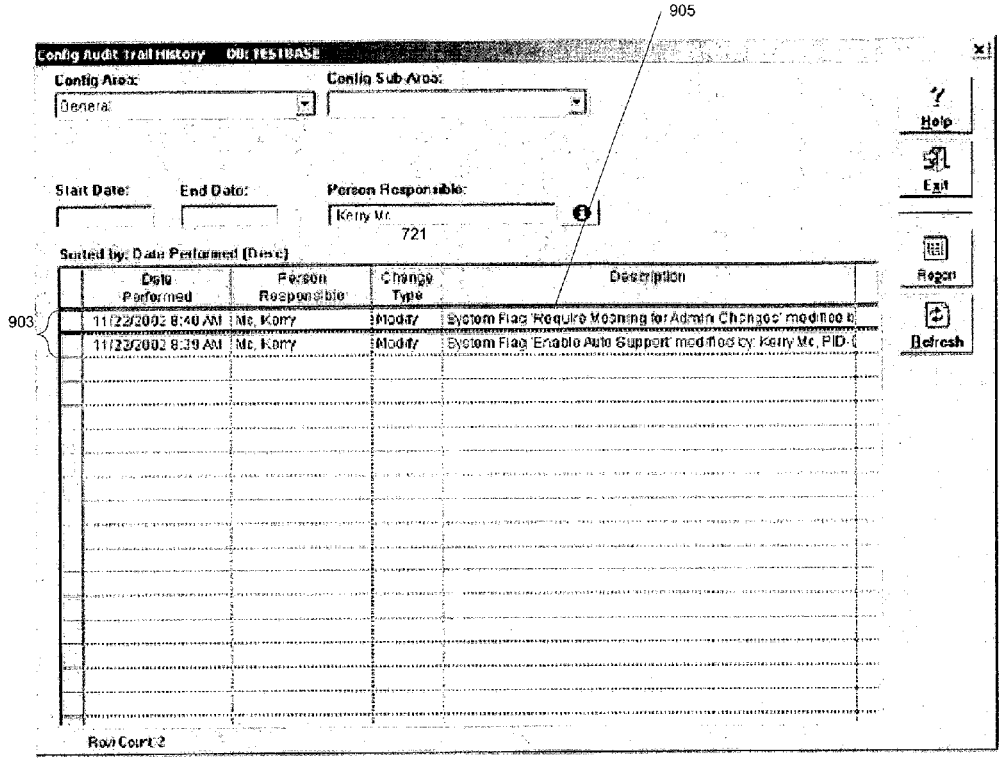
FIG. 9 shows constraint of a query by the person who made the change and the GUI for seeing details concerning a change.
Figure 9:
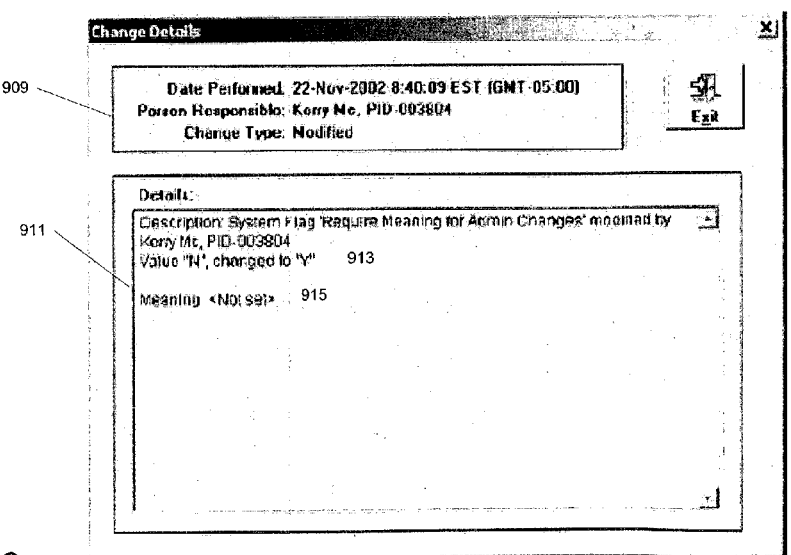

Continuing with details of making audit trail queries, FIG. 9 shows a window 901 in which the query returns all of the records in change_detail table 239 where the change has been made by "Mc, Kerry", as specified in field 721. What is returned here at 903 is all of the rows 241 in change_detail table 239 whose change_header_id fields specify rows in Change_header table 227 whose person_rel_id field specifies "Mc, Kerry".

Figure 10:
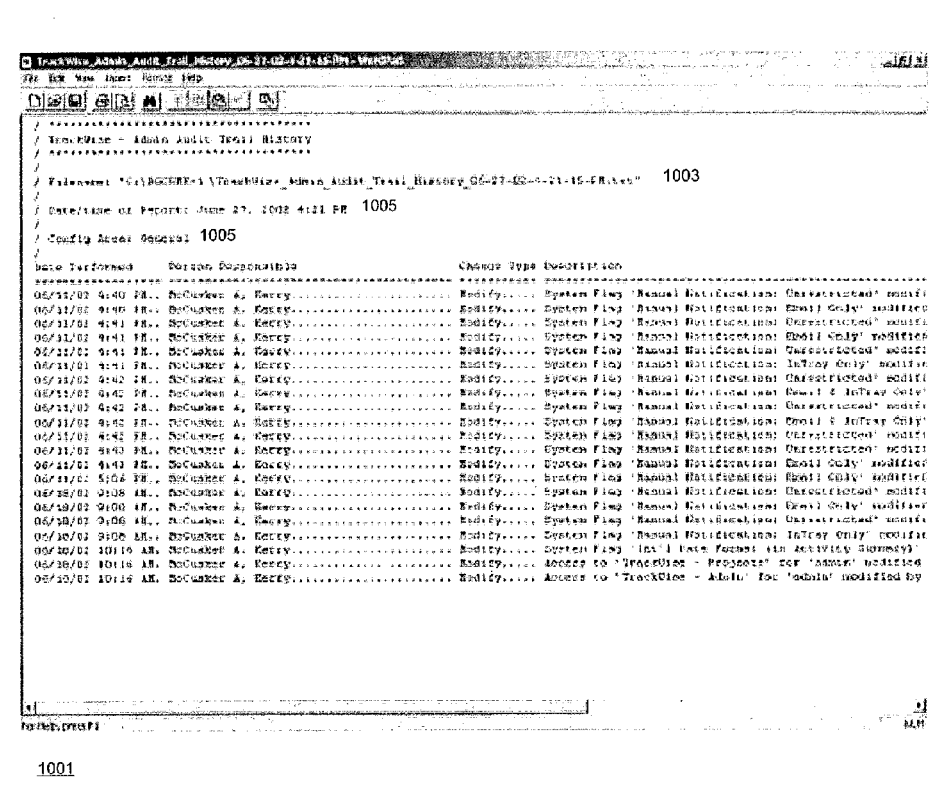

Window 907 in FIG. 9 shows what happens when a user of system 101 double clicks on a row of table 903. Further details are given about the modification at 909 and 911, including a complete display of the description and meaning at 911 that includes the change represented by the row at 913 and the meaning of the change at 915. Here, the Require Meaning for Admin Changes flag shown at 611 has not been set, and thus there need not be a meaning. FIG. 10 shows a window 1001 which displays a report that is generated when the user clicks on Report button 723. As shown at 1003, the window 1001 displays the file that contains the report at 1003, the date and time of the report at 1005, and the constraints used to make the report at 1005. Since the configuration area specified is General and there are no further constraints, the report will show all changes presently recorded in change_detail table 239 as well as information from change_header table 227 about the person making the change and meaning of the change.

CONCLUSION

The foregoing Detailed Description has disclosed Applicants' techniques for providing audit trails of configuration changes to those skilled in the relevant technologies and has also disclosed the best mode of implementing and using the techniques presently known to Applicants. It will be immediately apparent to those skilled in the relevant technologies that many implementations of the techniques other than the one disclosed herein are possible. Specific details of a given implementation will of course depend on the nature of the configurable system that the techniques are used in. For example, the exemplary implementation is part of a preexisting process control system and must necessarily take many aspects of the preexisting system into account. The configuration tables are those of the preexisting system and the particular subsets of the configuration tables employed in a preferred embodiment are determined by the architecture of the process control system, as are the system's GUI and the queries which one can specify from the GUI. Similarly, the relationships recorded in Config_table_rel are those required for the preexisting system.

Further, in the exemplary embodiment, the configuration tables that are being audited are determined by the manufacturer of the process control system. In other embodiments, however, the techniques of the invention might be employed to make it possible for users of the configurable system to decide which of the system's tables are included in the configuration system. In such an embodiment, it would be possible for the user to add tables to or delete them from the list of tables for which changes are being tracked and trigger code associated with the list of tables could associate the recording trigger with a table that had been newly added to the list and also require the user to provide the information required for the necessary rows in any equivalents the embodiment may have to the config_sub_area and config_table_rel tables.

Finally, other embodiments will be further determined by characteristics of the database management systems and the programming environments used to implement them, as well as by the design experience and preferences of the implementers. For all of the foregoing reasons, the Detailed Description is to be regarded as being in all respects exemplary and not restrictive, and the breadth of the invention disclosed here in is to be determined not from the Detailed Description, but rather from the claims as interpreted with the full breadth permitted by the patent laws.

What is claimed is:

1. A configurable system that is implemented with a processor and data storage accessible to the processor and includes a database management system,
   the configurable system comprising:
   one or more configuration tables in the database management system, the configurable system being configured by setting configuration values in the configuration tables;
   one or more configuration change recording tables in the database management system which record changes in the configuration values;
   a subset defining table in the database management system that defines one or more subsets of the configuration tables, and
   program code which is automatically executed by the configurable system in response to a change in a configuration value in any configuration table belonging to a subset of the configuration tables defined in the subset defining table and which records the change and a specification of the subset in the configuration change recording tables,
   whereby an audit trail of the changes in the tables belonging to the subset of the configuration tables defined in the subset defining table is obtained by making a query of the configuration change recording tables.

2. The configurable system set forth in claim 1 further comprising:
   a non-query-language based graphical user interface for specifying the query wherein the subset is specified.

3. The configurable system set forth in claim 1 wherein
   the change in the configuration value is made by a user of the configurable system,
   for a particular change, the execution of the program code includes a specification of the user who makes the particular change in the configuration change recording tables and
   wherein the configurable system further comprises:
   a non-query-language based graphical user interface for specifying the query wherein the particular user is specified.

4. The configurable system set forth in claim 1 wherein
   for a particular change in the configuration value, the execution of the program code includes a specification of when the particular change was made in the configuration change recording tables and
   the configurable system further comprises:
   a non-query-language based graphical user interface for specifying the query wherein a particular period of time is specified,
   whereby the audit trail is an audit trail of changes made during the particular period of time.

5. The configurable system set forth in claim 1 wherein:
for a particular change in the configuration value, the execution of the program code includes a specification of the kind of change in the configuration change recording tables and the configurable system further comprises:
a non-query-language based graphical user interface for specifying the query wherein a particular kind of change is specified,
whereby the audit trail is an audit trail of changes of the particular kind.

6. The configurable system set forth in claim 1 wherein:
a particular change in the configuration value is related to a value in another of the configuration tables,
for such a particular change, the execution of the program code includes a specification of the related value in the configuration change recording tables, and the configurable system further comprises:
a non-query-language based graphical user interface for specifying the query wherein the related value is specified,
whereby the audit trail is an audit trail of changed configuration values related to a particular value in the other configuration table.

7. The configurable system set forth in claim 1 wherein the subset defining table comprises:
a configuration area table that defines a first level of subsets of the configuration tables; and
a configuration subarea table that defines a second level of subsets of the configuration tables,
whereby the audit trail is an audit trail of changes in configuration values in a particular first or a particular second level of subsets.

8. The configurable system set forth in claim 7 further comprising:
a non-query-language based graphical user interface for specifying the query wherein a subset of the first or second level is specified.

9. The configurable system set forth in claim 1 further comprising:
a first relationship defining table that defines relationships between configuration tables; and
the configuration change recording tables record a relationship between a changed value in a given configuration table and a value in a configuration table that is related to the given configuration table, whereby the audit trail is an audit trail of changes in configuration values that are related to a particular value in the configuration table that is related to the given configuration table.

10. The configurable system set forth in claim 9 further comprising:
a graphical user interface for specifying the query wherein the related particular value is specified.

11. The configurable system set forth in claim 1 wherein:
prior to recording the change, the execution of the program code further responds to the change in the configuration value by producing a graphical user interface in which a user making the change selects a reason for the change from a list thereof and including a specification of the selected reason in the configuration change recording tables.

12. The configurable system set forth in claim 1 wherein:
prior to recording the change, the execution of the program code further responds to the change in the configuration value by producing a graphical user interface which requires that the user input authentication information and records the change only if the execution authenticates the user.

13. A data storage device, the data storage device being characterized in that:
the data storage device contains code which, when executed by a processor which has access to the data storage device, implements a configurable system that includes a database management system, the configurable system comprising:
one or more configuration tables in the database management system, the configurable system being configured by setting configuration values in the configuration tables,
a subset defining table in the database management system that defines one or more subsets of the configuration tables, and
program code which is automatically executed by the configurable system in response to a change in a configuration value in any configuration table belonging to a subset of the configuration tables defined in the subset defining table and which records the change and a specification of the subset in configuration change recording tables,
whereby an audit trail of the changes in the tables belonging to the subset of the configuration tables defined in the subset defining table is obtained by making a query of the configuration change recording tables.

14. A method employed in a configurable system that is implemented with a processor and data storage accessible to the processor and includes a database management system of making an audit trail of changes in one or more configuration tables in the database management system, the configurable system being configured by setting configuration values in the configuration tables; and
the method comprising the steps performed in the configurable system of:
defining a subset of the configuration tables in a subset defining table in the database management system;
automatically executing program code in response to a change in a configuration value and a specification of the defined subset in a configuration table belonging to the defined subset, execution of the program code resulting in the change in the configuration value being recorded in one or more configuration change recording tables in the database management system; and
making the audit trail by employing a non-query-language based graphical user interface wherein the defined subset is specified to query the configuration change recording tables.

15. A configurable system that is implemented with a processor and data storage accessible to the processor and includes a database management system, the configurable system comprising:
a plurality of configuration tables in the database management system, the configurable system being configured by setting configuration values in the configuration tables;
one or more configuration change recording tables in the database management system which record changes in the configuration values;
one or more subset defining tables in the database management system which define subsets of the configuration tables;
program code which is automatically executed by the configurable system in response to a change in a configuration value in a defined subset of the configuration tables and which records the change and a specification of the defined subset in the configuration change recording tables; and a non-query-language based graphical user interface that receives an input specifying one of the subsets of the configuration tables and produces a query that returns changes in the configuration tables belonging to the subset, whereby the user interface is used to obtain an audit trail of the changes in the configuration tables belonging to the subset.

* * * * *